E. BEATTY.
NUT AND WASHER THEREFOR.
APPLICATION FILED FEB. 3, 1920.
1,368,473.
Patented Feb. 15, 1921.
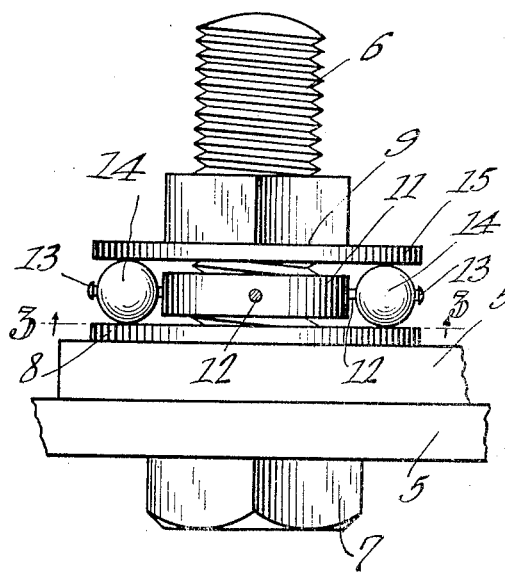
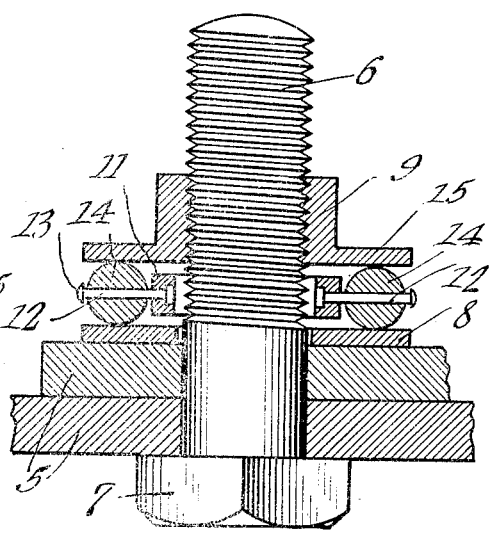
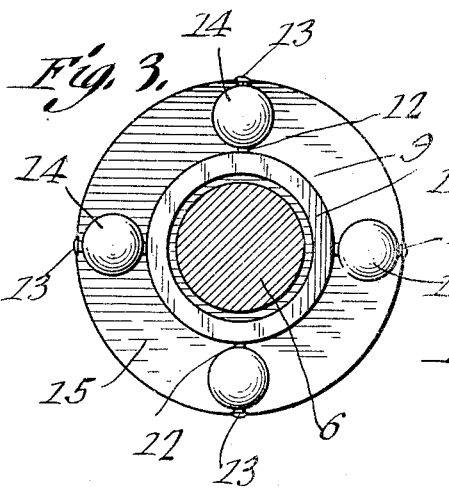
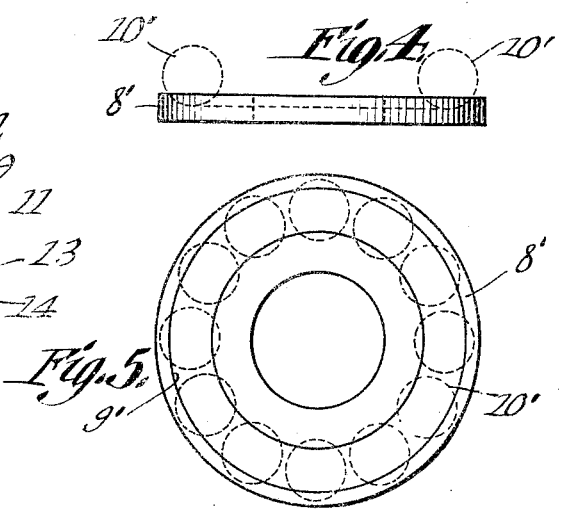
Inventor
E. Beatty
Witness
By
Attorneys

UNITED STATES PATENT OFFICE.

EDWARD BEATTY, OF HARRIMAN, PENNSYLVANIA.

NUT AND WASHER THEREFOR.

1,368,473.  Specification of Letters Patent.  Patented Feb. 15, 1921.

Application filed February 3, 1920. Serial No. 355,904.

*To all whom it may concern:*

Be it known that I, EDWARD BEATTY, a citizen of the United States, residing at Harriman, in the county of Bucks and State of Pennsylvania, have invented a new and useful Nut and Washer Therefor, of which the following is a specification.

This invention has reference to securing bolts, and more particularly to securing bolts employed for moving plates into close relation with each other.

The primary object of the invention is to provide means coöperating with the nut associated with the bolt, to facilitate the operation of the nut to increase the securing qualities of the device to more firmly unite the plates under operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a bolt and nut constructed in accordance with the present invention, the plates under the operation being shown as partly broken away.

Fig. 2 illustrates a longitudinal sectional view through the plates and securing nut.

Fig. 3 illustrates a sectional view taken on line 3—3 of Fig. 1.

Fig. 4 illustrates a modified form of a washer, and

Fig. 5 illustrates a plan view of the same.

Referring to the drawing in detail, the plates under operation, are indicated at 5, which plates are provided with the usual registering openings to receive the bolt 6, provided with the usual head 7, the shank of the bolt being of a length to extend an appreciable distance above the plates 5, to receive the washer 8 and nut 9.

The device forming the subject matter of the invention includes more particularly, a ring 11, having a central opening of a diameter greater than the diameter of the shank of the bolt, so that the ring may readily be positioned over the shank of the bolt. Disposed in spaced relation on the ring 11 are the stub shafts 12 extending radially therefrom, the stub shafts being provided with heads 13 so that the balls 14, which are supported on the shafts 12, may be held in proper relation with the ring 11.

As shown, each of the balls 14 is provided with a bore to accommodate the stub shaft 12 to allow the balls 14 to revolve on the shafts.

The nut 9, employed in connection with the present invention is provided with a relatively wide radial flange 15, adapted to contact with the balls 14 to decrease the resistance directed to the nut upon rotation of the nut along the threaded end of the bolt, when the nut is being operated to draw the metal plates 5 into close engagement with each other.

In Figs. 4 and 5 of the drawing, the ring 11 has been eliminated, the washer 8' being shown as provided with a cut out portion 9' to provide a run-way for the balls 10'.

From the foregoing it is obvious that the flanged nut, employed in connection with the device, contacts with the balls 10' to facilitate the rotation of the nut, to the end that the plates are more securely brought together.

Having thus described the invention, what I claim as new is:—

1. In combination with a bolt and a flanged nut operating thereon, a ring, a plurality of stub shafts radiating from said ring, said ring adapted to be positioned around the bolt, a ball positioned on each of the stub shafts and adapted to move with the ring, said flange nut adapted to engage the balls for permitting rotation of the nut with relation to the bolt.

2. In combination with a bolt and a flanged nut operating thereon, a washer positioned over the bolt, a plurality of balls supported on the washer, the flange of the nut contacting with the balls for permitting rotation of the nut.

In testimony that I claim the foregoing as my own, I have hereto affixed my signature in the presence of two witnesses.

EDWARD BEATTY.

Witnesses:
 DANIEL CALLAHAN,
 GEORGE CLIFFTON.